Figure 1:
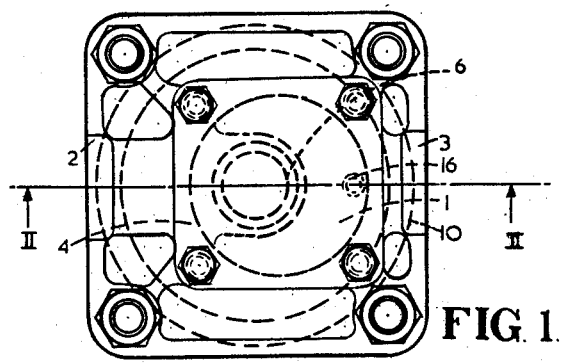

Dec. 18, 1962 R. T. LAWRENCE 3,068,885
DEVICE FOR INTRODUCING A FLUID INTO
A STREAM OF ANOTHER FLUID
Filed May 4, 1960 2 Sheets-Sheet 1

INVENTOR
RONALD THOMAS LAWRENCE
BY *Mawhinney & Mawhinney*
ATTYS.

Dec. 18, 1962  R. T. LAWRENCE  3,068,885
DEVICE FOR INTRODUCING A FLUID INTO
A STREAM OF ANOTHER FLUID

Filed May 4, 1960  2 Sheets-Sheet 2

Inventor
RONALD THOMAS LAWRENCE
By mashinney & mashinney
Attorney

United States Patent Office 3,068,885
Patented Dec. 18, 1962

1

3,068,885
DEVICE FOR INTRODUCING A FLUID INTO A STREAM OF ANOTHER FLUID
Ronald Thomas Lawrence, Crondall, England, assignor to Nuquip Limited, Surrey, England
Filed May 4, 1960, Ser. No. 26,873
Claims priority, application Great Britain Oct. 29, 1959
9 Claims. (Cl. 137—205.5)

The invention relates to a device for introducing a liquid into a stream of pressurised gas to provide a mixture of liquid and gas of predetermined proportions. The invention is particularly, but not exclusively, concerned with a device for mixing oil and air for lubrication or combustion or with a device for mixing water and air for air conditioning.

When gas is flowing through a pipe, there is a pressure drop and it has been found that if a liquid under the pressure at an upstream part of the pipe is introduced, through an orifice, into a downstream part of the pipe, the resultant mixture will be weaker for low rates of flow and stronger for high rates of flow of the gas. An object of the invention is to provide a device whereby the liquid and gas mixture can be maintained substantially constant or have a predetrminable variation over a wide range of rates of flow of the gas.

According to the present invention the device comprises a duct through which, in operation, a stream of pressurised gas is passed, valve means positioned in the duct and capable of producing a pressure drop in the gas flowing therethrough and at least one throughway in the duct, having its outlet located at a position of reduced pressure produced by the valve means and communicating with a source of liquid, the pressure of the liquid being substantially equal to the pressure upstream of the valve means, whereby the liquid can flow through the throughway, in accordance with the pressure drop produced by the valve means, the valve means being so biased as to produce a pressure drop which will produce a liquid and gas mixture of the desired proportions.

The valve means may comprise a valve seating in the duct and a valve member, which is biased towards the seating in the direction opposed to that of the gas flow therethrough. Conveniently, the valve member may be arranged for upward and downward movement, the seating being arranged substantially horizontal, so that the valve member is biased towards the seating by its own weight, the inlet for the gas being at the lower end of the seating. Alternatively or additionally, the valve member may be biased towards its seating against the fluid flow by spring means.

Figure 2:
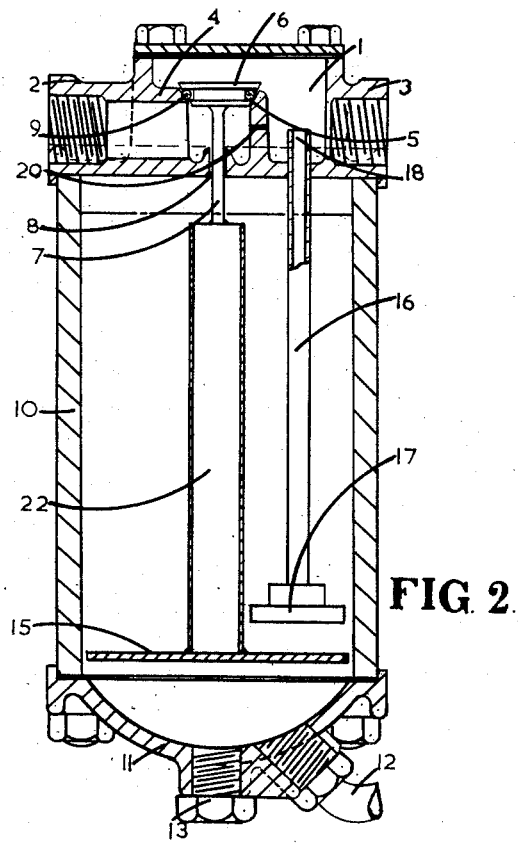
Figure 3:
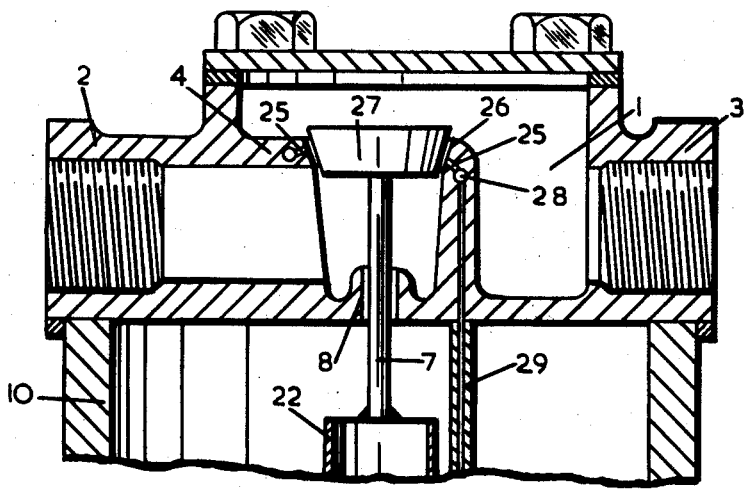

By way of example a device for introducing oil into a pipe line carrying compressed air for lubrication or combustion purposes will now be described with reference to the accompanying drawings, in which:

FIGURE 1 is a plan view of the device;
FIGURE 2 is a section on the line II—II in FIGURE 1, and
FIGURE 3 is similar to part of FIGURE 2 to a larger scale and shows a modified form of the device.

The device comprises a chamber 1 having an inlet 2 and an outlet 3 for connection in a pipe line carrying the compressed air. The chamber 1 has an internal partition 4 which has a hole therein, having a flat or bevelled edge forming a seating 5 for a valve member 6. The valve member 6 is mounted on a stem 7, which is arranged substantially vertically and is guided for vertical movement in a hole 8 in the lower wall of the chamber 1. When no air or an insufficient rate of air is flowing through the chamber, the valve member 6 rests, under its own weight and that of the stem 7, on the seating 5. A seal between the valve member 6 and the seating 5 is formed by an O

2 ring 9, carried in a groove extending circumferentially around the valve member 6.

Beneath the chamber 1 there is a cylindrical reservoir 10 containing oil, or other liquid fuel, which is to be introduced into the air stream. The lower end of the reservoir 10 is closed by a cover 11 containing a filling pipe 12 and a drain plug 13. The stem 7 of the valve member 6 is a loose fit in the hole 8 in the lower wall of the chamber 1, so that there is an air leak from the upstream side of the valve member 6 into the reservoir 10. The reservoir 10 contains the oil and this is therefore kept at a pressure substantially equal to the air inlet pressure. The lower end of the stem is formed as a tube 22, which will be described hereinafter. The tube 22 carries a damping-disc 15 which serves to slow down the vertical movement of the valve member. A pipe 16 having an open lower end 17 extends into the reservoir and passes through the lower wall of the chamber 1 into the part thereof downstream of the partition 4. The upper end of the pipe 16 is formed as a fine oil jet 18. The inlet end 17 of the pipe 16 is positioned at a sufficient height above the damping-disc 15 as to allow unrestricted upward movement of the disc 15 to permit the valve member 6 to open. The level of the oil in the reservoir is maintained above the inlet 17. The pipe 16 is sealed where it passes through the wall of the chamber 1, so that there is no leak of air from the reservoir into the downstream compartment of the chamber 1.

When air is flowing through the chamber 1, the valve member is lifted off its seating by the air flow, the amount of opening depending upon the rate of air flow. The opening of the valve results in a corresponding pressure drop in the air and therefore the downstream part of the chamber 1 is at a reduced pressure. Oil is forced up the pipe 16 due to the pressure drop across the valve and emerges through the jet 18 and there mixes with the air stream. Thus the flow of the second fluid, i.e., the oil, is regulated in response to the difference between the pressures upstream and downstream of the valve member 6, so that the rate of flow of the oil is proportional to the rate of flow of the first fluid, i.e., the air, through the chamber 1. A small diameter hole 20 is formed in the partition 4, so as to provide a direct flow path, by-passing the valve member 6, between the upstream and downstream compartments of the chamber 1. The provision of the hole 20 ensures that when the rate of flow of air is insufficient to move the valve member 6 away from its seating 5, there will still be communication between the upstream and downstream parts of the chamber 1. The outlet 18 of the pipe 16 is positioned just below the level of the by-pass hole 20 so that the current of air therethrough can produce a fine spray effect on the oil emerging through the outlet 18. The hole 20 may be shaped to form a nozzle capable of increasing the spray effect. The jet or other metering orifice may be submerged in the pipe 16 instead of being at the outlet thereof.

As stated hereinbefore, FIGURE 2 also shows a tube 22 carried on the lower end of the stem 7 and supporting the disc 15. The tube 22 is closed at its lower end and is open at its upper end and is of light, thin-walled construction. It is charged with oil, when the reservoir 10 is charged and remains charged with a constant volume of oil, despite oil consumption from the reservoir 10. The tube is made of very light material so that the effective density of the stem, including the tube 22 and the oil therein approximates to that of the oil. The purpose of the tube 22 is to increase the effective weight of the valve member 6 and the stem 7 as the oil level in the reservoir falls and thereby to increase the pressure drop across the valve member to enable the oil to be forced through the greater distance to the outlet of the pipe 16. The provision of the tube 22 is optional as means may be provided to keep the oil in the reservoir from falling below a predetermined level.

The device described with reference to FIGURES 1 and 2 may be modified, as shown in FIGURE 3, by replacing the jet 13 by a ring of small diameter holes or jets 25 formed in a valve seating 26, similar to the valve seating 5, and arranged to be closed by a valve member 27 when it is engaged with the seating 26. The holes or jets 25 are connected by an annular gallery 28 in the partition 4 and connected by a pipe 29 to the oil reservoir 10. In place of the hole 20 in the device shown in FIGURES 1 and 2, a small groove is formed in the seating 26 or in the valve member 27 so that when the rate of flow is insufficient to move the valve member away from its seating, there will still be communication between the upstream and downstream sides of the otherwise closed valve.

The modified device functions as follows: when compressed air is flowing through the chamber 1, the valve member 27 is lifted, against its own weight, from the seating 26 and so forms an annular throat, through which the flow area is smaller than the cross-sectional area of the chamber upstream and downstream of the valve member 27. In this way, the pressure in the vicinity of the throat is reduced by a venturi effect and is thus lower than the pressure in the reservoir 10. Oil is consequently forced through the said holes or jets 25 and forms a mist, which is carried in the compressed air stream through the chamber to the outlet 3. The amount of opening of the valve member 27 and hence the pressure in the throat and also the rate of flow of oil through the said holes or jets 25 depends upon the rate of flow of compressed air through the chamber 1.

In the devices illustrated in FIGURES 1 and 2 or in FIGURE 3, the valve member 6 or 27 may be arranged for movement in directions other than upwardly and downwardly, in which case a spring must be provided to urge the valve member towards its seating. In such an arrangement, the stem 7 would not be able to extend into the reservoir and also the damping-disc 15 would not be provided. The aforegoing devices offer very little resistance to the air flow and consequently there is only small loss of pressure. Additional variable biasing means may be provided on the valve member, the means being variable in accordance with the mixture desired.

The device described by way of example of the invention are intended for introducing oil into an air stream to provide a desired mixture for lubrication or combustion in an oil burner. The latter application has the advantage that regulation can be performed merely by altering the rate of flow of air through the pipe line, the device will then automatically provide the correct oil flow to give the desired mixture. Another application of the invention is for air conditioning, in which case the device will give a desired mixture of water droplets in an air stream.

What I claim as my invention and desire to secure by Letters Patent of the United States is:

1. A device comprising a duct through which, in operation, a gas is passed, valve means positioned in the duct and capable of producing a pressure drop in the gas flowing therethrough, at least one throughway in the duct, said throughway having an outlet communicating with the interior of said duct at a position downstream of said valve means, a reservoir closed to atmosphere for liquid to be supplied through said throughway and a leak path between said reservoir and said duct upstream of said valve means, whereby the gas pressure acting on said liquid in said reservoir is substantially equal to the pressure upstream of said valve means, said throughway having an inlet communicating with the liquid-containing portion of said reservoir, said reservoir being positioned beneath said valve means and said valve means comprising a substantially horizontal seating, to which the gas inlet is at the lower end thereof, a poppet-like valve member arranged to coact with the seating, a stem extending downwardly from the valve member into the reservoir and a disc carried at the lower end of the stem, the disc acting as a biasing weight for the valve member, the latter thereby producing a pressure drop capable of producing a liquid and gas mixture of the desired proportions, said disc also, in use, being immersed in the liquid in the reservoir and thereby providing damping means for said valve member.

2. A device as claimed in claim 1 in which said stem has an effective density of the order of that of the liquid.

3. A device as claimed in claim 2 in which said stem includes a light, thin-walled tube closed at its lower end and arranged to be charged with the same liquid as the reservoir and to retain a constant volume of said liquid therein, despite the consumption of liquid from said reservoir.

4. A device comprising a duct through which, in operation, a gas is passed, an internal annular valve seating in said duct intermediate its inlet and outlet, a poppet-like valve member biased toward said seating in the direction opposed to that of gas flow therethrough and forming with said seating, when the valve member is slightly separated therefrom, an annular throat, capable of producing a pressure drop in the gas flowing through said seating, at least one throughway in said duct, said throughway having an outlet located at a position of reduced pressure, produced in said duct by said valve member, a reservoir closed to atmosphere for liquid to be supplied through said throughway, a gas communication between said reservoir and a position in said duct upstream of said valve member, whereby the gas pressure acting on said liquid in said reservoir is substantially equal to the pressure upstream of said valve member, said throughway having an inlet communicating with the liquid-containing portion of said reservoir, the liquid thereby being able to flow through said throughway to said position of reduced pressure, said reservoir being positioned beneath said valve member, said valve member and said seating being substantially horizontal, a stem extending downwardly from said valve member into said reservoir and a disc carried at the lower end of said stem, said disc acting as a biasing weight for said valve member, the latter thereby producing a pressure drop capable of producing a liquid and gas mixture of the desired proportions, said disc also, in use, being immersed in the liquid in said reservoir and thereby providing damping means for said valve member.

5. A device as claimed in claim 4 in which the outlet of said throughway is controllable by said valve member.

6. A device as claimed in claim 5 in which said outlet is positioned in said annular seating.

7. A device comprising a chamber through which, in operation, a gas is passed, inlet and outlet means in said chamber adapted to be connected respectively to inlet and outlet pipes for the gas, valve means positioned in said chamber and capable of producing a pressure drop in the gas flowing therethrough, at least one throughway in said chamber, said throughway having an outlet communicating with the interior of said chamber at a position of reduced pressure produced in said chamber by said valve means, a reservoir closed to atmosphere for liquid ot be supplied through said throughway and a gas communication between said reservoir and a position in the duct upstream of said valve means, whereby the gas pressure acting on said liquid in said reservoir is substantially equal to the pressure upstream of said valve means, said throughway having an inlet communicating with the liquid-containing portion of said reservoir, the liquid thereby being able to flow through said throughway to said position of reduced pressure, said reservoir being positioned beneath said valve means, and said valve means comprising a substantially horizontal seating, to which the gas inlet is at the lower end thereof, a poppet-like valve member arranged to coact with the seating, a stem extending downwardly from said valve member into said reservoir and a disc carried at the lower end of said stem, said disc acting as a biasing weight for said valve member, the latter thereby producing a pressure drop capable of producing a liquid and gas mixture of the desired proportions, said disc also, in use, being immersed in the liquid in said reservoir and thereby providing damping means for said valve member.

8. A device comprising a duct through which, in operation, a gas is passed, valve means positioned in the duct and capable of producing a pressure drop in the gas flowing therethrough, at least on throughway in the duct, said throughway having an outlet located at a position of reduced pressure produced in said duct by said valve means, a reservoir closed to atmosphere for liquid to be supplied through said throughway and a gas communication between said reservoir and a position in the duct upstream of said valve means, whereby the gas pressure acting on said liquid in said reservoir is substantially equal to the pressure upstream of said valve means, said throughway having an inlet communuicating with the liquid-containing portion of said reservoir, the liquid thereby being able to flow through said throughway to said position of reduced pressure, the valve means being biased to produce a pressure drop capable of producing a liquid and gas mixture of the desired proportions, the device also comprises means defining a by-pass flow path of small cross-sectional area between upstream and downstream sides of said valve means, said means defining said by-pass flow path being positioned adjacent the outlet of said throughway to produce a spray effect on the liquid emerging from said throughway.

9. A device as claimed in claim 8 in which said means defining the by-pass flow path is in the shape of a nozzle.

References Cited in the file of this patent
UNITED STATES PATENTS

| | | |
|---|---|---|
| 1,592,747 | Slagle | July 13, 1926 |
| 2,088,082 | Davis | July 27, 1937 |
| 2,571,476 | Offutt | Oct. 16, 1951 |
| 2,856,234 | McNair | Oct. 14, 1958 |
| 2,966,312 | Wilson | Dec. 27, 1960 |